(12) United States Patent
Zavesky et al.

(10) Patent No.: US 10,810,324 B2
(45) Date of Patent: Oct. 20, 2020

(54) METHODS, SYSTEMS AND ALGORITHMS FOR PROVIDING ANONYMIZATION

(71) Applicant: AT&T Intellectual Property I, L.P., Atlanta, GA (US)

(72) Inventors: Eric Zavesky, Austin, TX (US); Lee Begeja, Gillette, NJ (US); Behzad Shahraray, Holmdel, NJ (US); David Crawford Gibbon, Lincroft, NJ (US); Tan Xu, Bridgewater, NJ (US); Zhu Liu, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 270 days.

(21) Appl. No.: 15/958,131

(22) Filed: Apr. 20, 2018

(65) Prior Publication Data

US 2019/0325161 A1    Oct. 24, 2019

(51) Int. Cl.
*G06F 21/62* (2013.01)
*H04L 29/06* (2006.01)
(Continued)

(52) U.S. Cl.
CPC ...... *G06F 21/6254* (2013.01); *G06F 16/9535* (2019.01); *G06F 21/6263* (2013.01);
(Continued)

(58) Field of Classification Search
CPC ............. G06F 21/6254; G06F 21/6263; G06F 16/9535; H04W 12/02; H04W 4/08;
(Continued)

(56) References Cited

U.S. PATENT DOCUMENTS

| 5,961,593 A | 10/1999 | Gabber et al. |
| 7,693,283 B2 | 4/2010 | Livesay et al. |

(Continued)

FOREIGN PATENT DOCUMENTS

| EP | 2800332 A1 | 11/2014 |
| WO | 0148628 A8 | 10/2001 |

(Continued)

OTHER PUBLICATIONS

A. M. Elmisery and D. Botvich, "Privacy Aware Recommender Service for IPTV Networks," 2011 Fifth FTRA International Conference on Multimedia and Ubiquitous Engineering, Loutraki, 2011, pp. 160-166. (Year: 2011).*

(Continued)

*Primary Examiner* — Robert B Leung
(74) *Attorney, Agent, or Firm* — Guntin & Gust, PLC; Matthew Tropper

(57) ABSTRACT

Aspects of the subject disclosure may include, for example, embodiments for providing anonymization. The anonymization can be provided such as to implement, for example, privacy as a service. The anonymization can be directed to emails, web activity (e.g., searching, viewing), browser history, telephone calls and/or physical mail. Mechanisms can be provided via which publication (e.g., online publication; publication in the form of information or data (such as marketing data)) of certain likes/dislikes that a person has can be controlled (e.g., certain likes/dislikes can be prohibited from being made public; certain likes/dislikes can be prohibited from being sold as marketing data; certain likes/dislikes can be allowed to be made public; certain likes/dislikes can be allowed to be sold as marketing data). Other embodiments are disclosed.

20 Claims, 11 Drawing Sheets

(51) Int. Cl.
| | |
|---|---|
| *G06Q 30/06* | (2012.01) |
| *H04W 4/08* | (2009.01) |
| *H04L 29/08* | (2006.01) |
| *G06F 16/9535* | (2019.01) |
| *H04W 12/02* | (2009.01) |

(52) U.S. Cl.
CPC ..... *G06Q 30/0631* (2013.01); *H04L 63/0421* (2013.01); *H04L 67/22* (2013.01); *H04L 67/306* (2013.01); *H04W 4/08* (2013.01); *H04W 12/02* (2013.01)

(58) Field of Classification Search
CPC ... H04L 67/306; H04L 67/22; H04L 63/0421; G06Q 30/0631
See application file for complete search history.

(56) References Cited

U.S. PATENT DOCUMENTS

| | | | |
|---|---|---|---|
| 8,219,135 B2 | 7/2012 | De Amorim et al. | |
| 8,291,474 B2 | 10/2012 | Anderson et al. | |
| 8,302,161 B2 | 10/2012 | Burch et al. | |
| 8,752,196 B2 | 6/2014 | King et al. | |
| 8,812,372 B2 | 8/2014 | Taysom et al. | |
| 8,812,373 B2 | 8/2014 | Johnson et al. | |
| 9,262,623 B2 | 2/2016 | Stecher | |
| 9,357,059 B2 | 5/2016 | Chatterjee | |
| 9,361,481 B2 | 6/2016 | Lafever et al. | |
| 9,430,671 B2 | 8/2016 | Aghasaryan et al. | |
| 9,584,526 B2 | 2/2017 | Williams et al. | |
| 9,602,472 B2 | 3/2017 | Nandi et al. | |
| 9,769,121 B2 | 9/2017 | Joy et al. | |
| 9,843,584 B2 | 12/2017 | Clark et al. | |
| 2002/0120563 A1* | 8/2002 | McWilliam | G06Q 20/04 705/39 |
| 2013/0138698 A1* | 5/2013 | Harada | G06F 21/6254 707/797 |
| 2013/0144721 A1* | 6/2013 | Noh | G06Q 30/0269 705/14.55 |
| 2014/0046743 A1 | 2/2014 | Yarvis et al. | |
| 2014/0074976 A1 | 3/2014 | Greenberg et al. | |
| 2014/0214895 A1 | 7/2014 | Higgins et al. | |
| 2014/0223575 A1 | 8/2014 | Nandi et al. | |
| 2014/0380498 A1* | 12/2014 | Toyoda | G06F 21/6254 726/27 |
| 2015/0135329 A1* | 5/2015 | Aghasaryan | H04L 67/306 726/26 |
| 2016/0078350 A1* | 3/2016 | Yarvis | G06N 5/04 706/11 |
| 2016/0292455 A1* | 10/2016 | Jebara | G06F 21/6245 |
| 2017/0078406 A1 | 3/2017 | Ruge | |
| 2017/0177683 A1 | 6/2017 | Koike et al. | |
| 2017/0262654 A1 | 9/2017 | Wouhaybi et al. | |
| 2017/0279775 A1 | 9/2017 | Savolainen | |
| 2018/0053236 A1* | 2/2018 | Fransen | G06Q 30/0631 |

FOREIGN PATENT DOCUMENTS

| | | |
|---|---|---|
| WO | 0186568 A1 | 11/2001 |
| WO | 2005008385 A2 | 1/2005 |
| WO | 2016198229 A1 | 12/2016 |

OTHER PUBLICATIONS

"AT&T GigaPower Vs. Comcast Business Class Internet Service", https://michaelkummer.com/technology/att-gigapower-vs-comcast-business-class-internet-service/ Feb. 15, 2018, 24 pages.

"AT&T Network 3.0 Indigo Redefining Connectivity through Software Control, Big Data and Blazing Speed", http://about.att.com/story/indigo_redefining_connectivity.html Feb. 1, 2017, 3 pages.

"Choose to anonymize your email address", Craigslist, accessed Apr. 16, 2018, 1 page.

"Guerrilla Mail—Disposable Temporary E-Mail Address", https://www.guerrillamail.com, accessed Apr. 16, 2018, 2 pages.

"Guerrilla Mail Application", https://play.google.com/store/apps/details?id=com.guerrillamail.app accessed Apr. 16, 2018, 3 pages.

"Private Browsing—Use Firefox without saving history", Mozilla Support, accessed Apr. 16, 2018, 3 pages.

"Tor (anonymity network)", Wikipedia, accessed Apr. 16, 2018, 26 pages.

Brodkin, Jon, "AT&T to end targeted ads program, give all users lowest available price", arstechnica, Sep. 30, 2016, 5 pages.

Eckert, "Internet anonymity: Problems and solutions", IFIP International Information Security Conference, 2001, 16 pages.

Freedman, et al., "Tarzan: A peer-to-peer anonymizing network layer", Proceedings of the 9th ACM conference on Computer and communications security, ACM, 2002, 14 pages.

Bode, Karl, "Opting Out of AT&T's 'Gigapower' Snooping is Comically Expensive", DSLReports, May 14, 2014, 2 pages.

Mohr, et al., "An Anonymous Email Relay Server", https://courses.csail.mit.edu/6.857/2016/files/mohr-root-robinson-lee.pdf May 2015, 9 pages.

Poulis, et al., "Select-organize-anonymize: A framework for trajectory data anonymization", 2013 IEEE 13th International Conference on Data Mining Workshops, 2013, 140 pages.

Xu, et al., "Online Anonymity for Personalized Web Services", http://citeseerx.ist.psu.edu/viewdoc/download?doi=10.1.1.156.8084&rep=rep1&type=pdf, 2009, 4 pages.

* cited by examiner

100

200

```
┌─────────────────────────────────────────────────────────────────────────────┐
│ Generating a plurality of groups including a first group and a second group,│
│ wherein each of the plurality of groups has a hierarchical structure,       │
│ wherein the first group has a first top-level characteristic and a first    │
│ sub-level characteristic that is a first subset of the first top-level      │
│ characteristic, wherein the second group has a second top-level             │
│ characteristic and a second sub-level characteristic that is a second       │
│ subset of the second top-level characteristic, and wherein the first        │
│ top-level characteristic is different from the second top-level             │
│ characteristic                                                          303 │
└─────────────────────────────────────────────────────────────────────────────┘
                                     │
                                     ▼
┌─────────────────────────────────────────────────────────────────────────────┐
│ Assigning a plurality of first users to the first group, the second group,  │
│ or a combination thereof, wherein the assigning of the plurality of first   │
│ users is based on a first correlation between a first user characteristic   │
│ of the first users and one or more of the first top-level characteristic    │
│ and the second top-level characteristic                                 305 │
└─────────────────────────────────────────────────────────────────────────────┘
                                     │
                                     ▼
┌─────────────────────────────────────────────────────────────────────────────┐
│ Assigning a second user to at least the first group, wherein the assigning  │
│ of the second user is based on a second correlation between a second user   │
│ characteristic of the second user and the first top-level characteristic    │
│ of the first group                                                      307 │
└─────────────────────────────────────────────────────────────────────────────┘
                                     │
                                     ▼
┌─────────────────────────────────────────────────────────────────────────────┐
│ Generating a recommendation of a product or a service provided by a vendor, │
│ wherein the recommendation is based on a prior transaction between the      │
│ vendor and at least one of the plurality of first users assigned to the     │
│ first group                                                             309 │
└─────────────────────────────────────────────────────────────────────────────┘
                                     │
                                     ▼
┌─────────────────────────────────────────────────────────────────────────────┐
│ Obtaining, from the second user, an indication of which one of the first    │
│ top-level characteristic or the first sub-level characteristic to associate │
│ with the second user in connection with a purchase to be made from the      │
│ vendor by the second user                                               311 │
└─────────────────────────────────────────────────────────────────────────────┘
                                     │
                                     ▼
┌─────────────────────────────────────────────────────────────────────────────┐
│ Responsive to receiving an instruction to make the purchase, communicating  │
│ with the vendor to enable completion of the purchase                    313 │
└─────────────────────────────────────────────────────────────────────────────┘
```

METHODS, SYSTEMS AND ALGORITHMS FOR PROVIDING ANONYMIZATION

FIELD OF THE DISCLOSURE

The subject disclosure relates to methods, systems and algorithms for providing anonymization. The anonymization can be provided such as to implement, for example, privacy as a service.

BACKGROUND

Certain conventional mechanisms have provided, for example, user anonymity in online transactions. Other conventional mechanisms have provided, for example, anonymous ecommerce shipment. Still other conventional mechanisms have provided, for example, anonymous transactions and disguised mailings. Still other conventional mechanisms have provided, for example, anonymizing a telephone number.

BRIEF DESCRIPTION OF THE DRAWINGS

Reference will now be made to the accompanying drawings, which are not necessarily drawn to scale, and wherein:

FIG. 3A depicts an embodiment of a method (which can be used, for example, in portions of the systems described in FIGS. 1, 2, 6 and 7);

DETAILED DESCRIPTION

The subject disclosure describes, among other things, illustrative embodiments for providing anonymization. The anonymization can be provided such as to implement, for example, privacy as a service. Other embodiments are described in the subject disclosure.

One or more aspects of the subject disclosure include mechanisms that provide for securing privacy through anonymization, wherein the anonymization can be directed to emails, web activity (e.g., searching, viewing), browser history, telephone calls and/or physical mail.

One or more aspects of the subject disclosure include mechanisms via which a first person trying to monitor the activities of a second person would not be able to identify the second person as the sender or recipient (the anonymization could be carried out, for example, via use of different email addresses, different IP addresses, and/or different physical mailing addresses).

One or more aspects of the subject disclosure include mechanisms via which publication (e.g., online publication; publication in the form of information or data (such as marketing data)) of certain likes/dislikes that a person (e.g. a user of the services described herein) has can be controlled (e.g., certain likes/dislikes can be prohibited from being made public; certain likes/dislikes can be prohibited from being sold as marketing data; certain likes/dislikes can be allowed to be made public; certain likes/dislikes can be allowed to be sold as marketing data).

One or more aspects of the subject disclosure include anonymization functionality that can be used to provide recommendations for shared user experiences.

Figure 1:
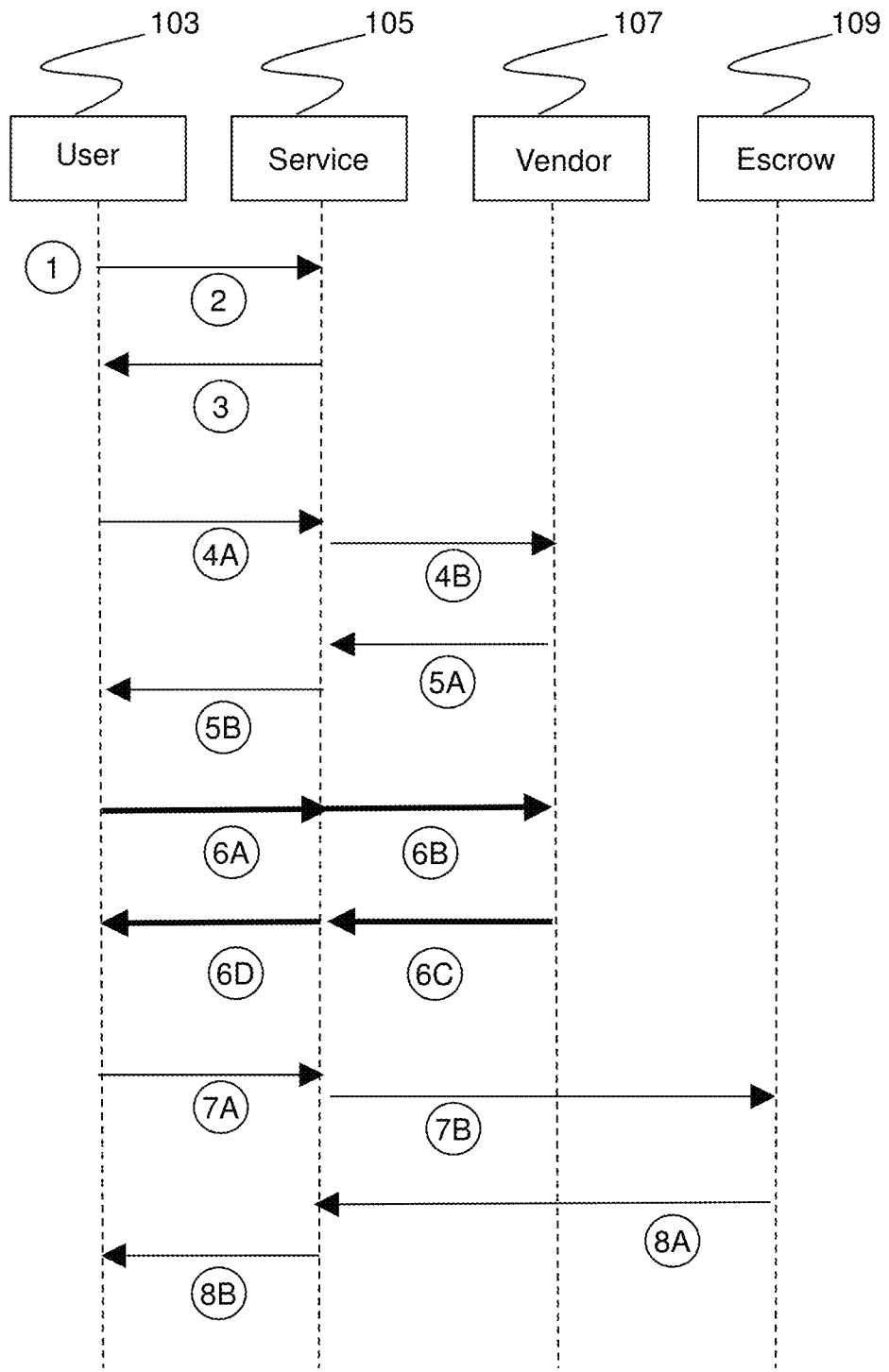
FIG. 1 depicts a diagram related to user interaction with an anonymization service according to an embodiment.

Referring now to FIG. 1, this depicts a diagram 100 showing an example operation of a system and/or method according to an embodiment. In one specific example, the diagram 100 of this FIG. 1 can be applicable to a privacy-conscious home user. At point 1 in the diagram, user 103 decides that he wants to anonymize (and/or protect) his online and interpersonal actions (e.g., shopping, communicating, reading online news). In one example, the user can, before performing addition steps, create an account with service 105 (service 105 can be implemented, for example, as an anonymization system). The user's account can be created, for example, by specifying some general group details (e.g., the user may specify that he likes movies, that he likes certain goods/products, that he likes animals, that he owns a pet, etc.).

Still referring to FIG. 1, after account creation, the user 103 begins to relay internet traffic (e.g., via computer), mobile device traffic (e.g., via cell phone), call traffic (e.g., via cell phone, internet protocol phone and/or landline phone) and/or physical mail traffic through service 105. As seen at arrow 2 in the diagram, the traffic can pass from user 103 (e.g., from a device of the user 103) to the service (e.g., to one or more computer systems that implement the service 105). The service 105 can then forward the traffic depicted by arrow 2 to the recipient of the traffic and receive back from the recipient of the traffic return traffic. As seen at arrow 3 in the diagram, the service 105 can then forward the return traffic to the user (e.g., a device of the user). In one example, web traffic of the user 103 can be proxied through a browser service (e.g., provided by service 105). In another example, phone calls of the user 103 can be routed through a VoIP service (e.g., provided by service 105) to a bank of phone numbers. In another example, physical packages of the user 103 can be delivered to an intermediate location. In one specific example, service providers (e.g., service providers other than a provider of service 105) can utilize their physical stores (e.g. retail stores) as delivery and pick-up locations. In another example, payment can be routed through one or more accounts established with service 105. In another example, text messages, IMS, SMS, etc. can be routed through an anonymization mechanism (e.g., provided by service 105).

In one example, service 105 learns from user actions and maps the user actions to a subset of multiple groups (such groups can be maintained by one or more computer systems that implement the service 105). The mapping can be performed by clustering (e.g. movie goer, shopper, dog-lover, pet owner) and/or weighting. In another example, user 103 can (at any time) add other group interests manually to assist service 105 in anonymization. In another example, user 103 can choose to opt-in to one (or more) of the created groups. In another example, instead of being associated with one or more groups the user 103 can fully utilize anonymization (e.g., full anonymization mode) whereby all actions by the user are anonymized (and/or proxied).

Still referring to FIG. 1, an example will now be discussed that is directed to anonymization of different purchase and use actions that interact with a vendor (e.g., a vendor of goods and/or services). As seen at arrows 4A, 4B and 5A, 5B in the diagram, the user 103 can anonymously interact with vendor 107 (e.g., anonymously interact with a website and/or computer system of vendor 107). For example, at arrow 4A the user 103 (e.g., via a device of the user 103) can send information (e.g., data related to a purchase) to service 105 and then service 105 can forward that data (in an anonymized form) to vendor 107 (see arrow 4B). In addition, at arrow 5A the vendor 107 can send reply information (e.g., reply data related to the purchase) to service 105 and then service 105 can forward the reply data (see arrow 5B) to the user 103 (e.g., to a device of the user 103). In one example, the service 105 allows multiple account types to be created with vendors, either on behalf of the user and/or in bulk. The term "bulk" refers to an anonymous block of multiple accounts that could be reused for one or more future transactions. For example, instead of creating only a single account in response to one user request, ten or twenty accounts could be created and randomly used for future transactions. Bulk account blocks allow the creation, deletion, and use time of service accounts to further anonymize the interactions of individual users of the service. In another example, users could either use a bulk account temporarily or the account could be created and destroyed. In one example, bulk account destruction could be at the discretion of the service provider. In another example, deletion of bulk accounts would truly anonymize a user transaction because it would never again be used. In another example, the service 105 could make its own marketplace or interface for the vendor (e.g., via an application programming interface (API) provided by an operator of the service 105). In another example, the service 105 could interface with the vendor via an API provided by the vendor. In another example, the account in use could be associated with a particular group or totally random (with respect to user actions). For example, the service can group transactions from multiple users with similar preferences to reinforce a particular apparent property to the vendor. In one specific example, the service can group purchases of dog food from different customers into a single bulk account such that a vendor begins to profile and advertise dog food related products to that bulk account.

In another example, the user 103 can chose (at any time) to disable anonymization while still using the service 105 (see arrows 6A, 6B and 6C, 6D of FIG. 1 showing user 103 communication (e.g., via a device of user 103) with vendor 107 (e.g., a website and/or computer system of vendor 107) without anonymization.

In another embodiment, various features can be directed to physical delivery and phone calls. For package and call routing, optionally, other third-party escrow users and/or services could be utilized. These escrow users/services could be proximal to the user and accept (and/or deliver) packages to the true end user (in various examples, this can be carried out via use of a post office with specific security codes, etc.). FIG. 1 shows Escrow 109 interacting with service 105, wherein service 105 is acting as an intermediary for user 103 (see arrows 7A, 7B and 8A, 8B). In another example, physical delivery can be accomplished via use of drone networks and/or other package delivery vendors.

In another example, over time the user 103 could create and/or erase various actions and/or group/profile information stored with the service 105.

In another example, over time various user actions and/or group/profile information stored with the service 105 can "fade" (lose prior knowledge over time). Such fading can be under the control of the user and/or can occur automatically (e.g., on a certain schedule).

In another example, for warranty (and/or returns) the service 105 can have some persistence for purchases. In one specific example related to warranty/returns, the anonymization can be reversed (e.g., user 103 sends item back to vendor 107) and/or service 105 can send proof of purchase (e.g., to vendor 107). In another example, user 103 can be assigned a unique identity created by the service 105 and either transfer ownership of item(s) legally or make the account with real user identity information.

While one user 103 was described in connection with FIG. 1, it is to be understood that the service 105 can be configured to interact with any desired number of users. In addition, while one vendor 107 was described in connection with FIG. 1, it is to be understood that the service 105 can be configured to interact with any desired number of vendors. In addition, while one escrow 109 was described in connection with FIG. 1, it is to be understood that the service 105 can be configured to interact with any desired number of escrows. In addition, while one service 105 was described in connection with FIG. 1, it is to be understood that the service 105 can be any desired number of services. Moreover, any communication associated with FIG. 1 can be carried out via any desired communication channel (e.g., the Internet).

Figure 2:
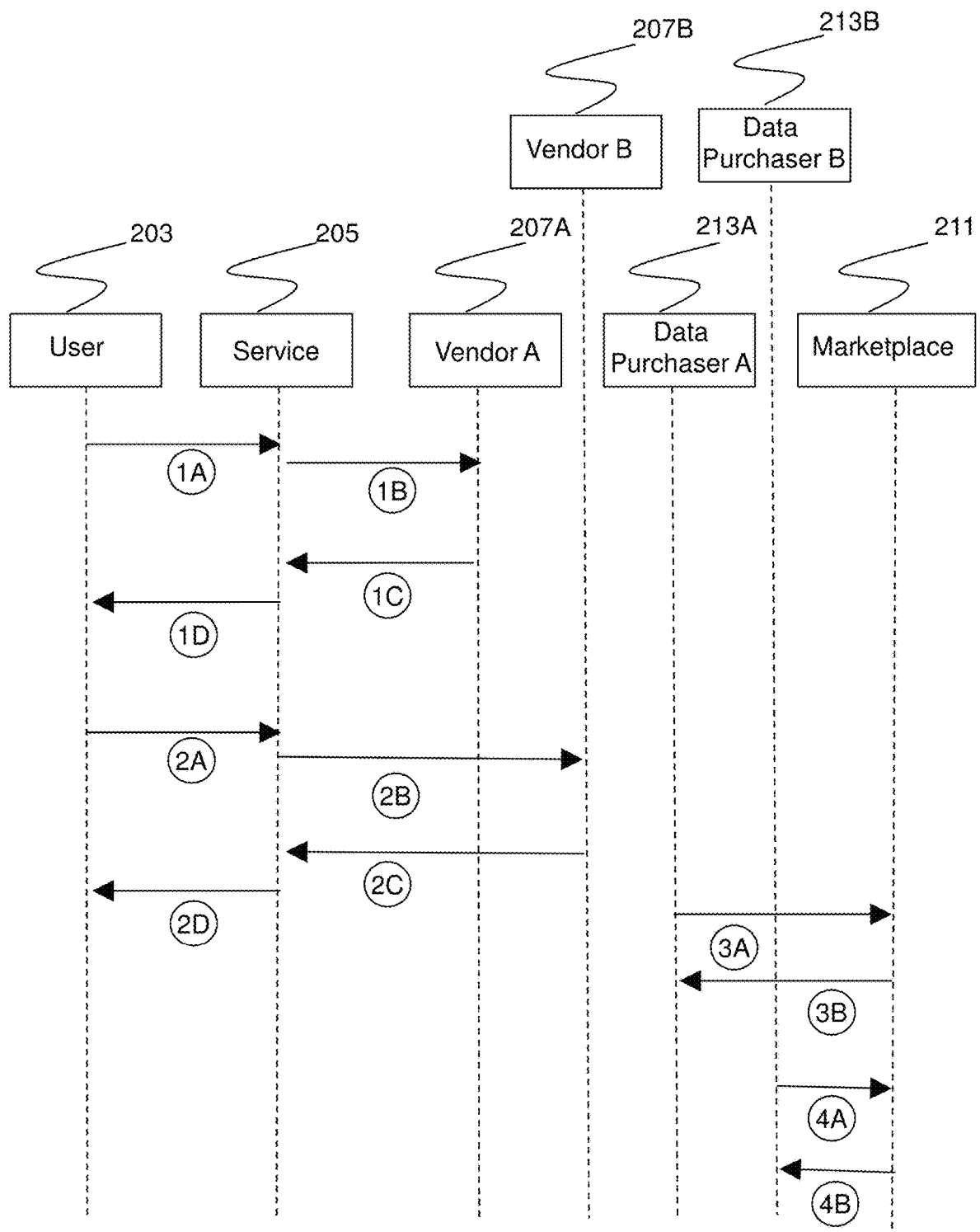
FIG. 2 depicts a diagram related to user interaction with an anonymization service according to an embodiment.

Referring now to FIG. 2, this depicts a diagram 200 showing an example operation of a system and/or method according to an embodiment. In one specific example, the diagram 200 of this FIG. 2 can be applicable to a user who wants to monetize his or her data. In this example, the user 203 uses anonymization service (as described, herein) to hide and aggregate actions and uses of Vendors A and B (see arrows 1A, 1B, 1C, 1D (related to Vendor A (call out label 207A) and arrows 2A, 2B, 2C, 2D (related to Vendor B (call out label 207B). Over time, user 203 builds a profile overlapping with many groups that are automatically identified by the service 205. In addition, service 205 exposes marketplace 211. This marketplace 211 can comprise, for example, a marketplace for information (e.g., usage data and/or transaction data) relating to one or more users and/or relating to one or more vendors). In another example, the marketplace 211 can be a marketplace for usage information relating to one or more groups. In one embodiment, the information sold at marketplace 211 can be sold to one or more data purchasers (see, e.g., data purchaser A (call out label 213A) communicating with marketplace 211 via arrows 3A, 3B and data purchaser B (call out label 213B)) communicating with marketplace 211 via arrows 4A, 4B. In one example, service 205 can allow interested parties (such as data purchaser A and data purchaser B) to price the value of the information sold at the marketplace 211. In one specific example, the data purchasers can comprise marketing and research vendors. In one embodiment, each user can choose which of his or her associated user characteristics, groups and/or subgroups can be exposed through the marketplace 211 (each user may chooses, for example, based on monetary value of the information). In another embodiment, each user can recall and/or exclude their action data (e.g., via permissions) from marketplace 211 at any time (such as, for example, in following the Indigo community action of revoking access to data). In another embodiment, the service 205 can help to convey payment to user 203 for marketplace information sharing/sales.

While one user 103 was described in connection with FIG. 2, it is to be understood that the service 205 can be configured to interact with any desired number of users. In addition, while two vendors 207A, 207B were described in connection with FIG. 2, it is to be understood that the service 205 can be configured to interact with any desired number of vendors. In addition, while two data purchasers 213A, 2137B were described in connection with FIG. 2, it is to be understood that the service 205 can be configured to interact with any desired number of data purchasers. In addition, while one marketplace 211 was described in connection with FIG. 2, it is to be understood that the service 205 can be configured to interact with any desired number of marketplaces. In addition, while one service 205 was described in connection with FIG. 2, it is to be understood that the service 205 can be any desired number of services. Moreover, any communication associated with FIG. 2 can be carried out via any desired communication channel (e.g., the Internet).

Referring now to FIG. 3A, various steps of a method 300 according to an embodiment are shown. As seen in this FIG. 3A, step 303 comprises generating a plurality of groups including a first group and a second group, wherein each of the plurality of groups has a hierarchical structure, wherein the first group has a first top-level characteristic and a first sub-level characteristic that is a first subset of the first top-level characteristic, wherein the second group has a second top-level characteristic and a second sub-level characteristic that is a second subset of the second top-level characteristic, and wherein the first top-level characteristic is different from the second top-level characteristic. Next, step 305 comprises assigning a plurality of first users to the first group, the second group, or a combination thereof, wherein the assigning of the plurality of first users is based on a first correlation between a first user characteristic of the first users and one or more of the first top-level characteristic and the second top-level characteristic. Next, step 307 comprises assigning a second user to at least the first group, wherein the assigning of the second user is based on a second correlation between a second user characteristic of the second user and the first top-level characteristic of the first group. Next, step 309 comprises generating a recommendation of a product or a service provided by a vendor, wherein the recommendation is based on a prior transaction between the vendor and at least one of the plurality of first users assigned to the first group. Next, step 311 comprises obtaining, from the second user, an indication of which one of the first top-level characteristic or the first sub-level characteristic to associate with the second user in connection with a purchase to be made from the vendor by the second user. Next, step 315 comprises receiving, from the second user, an instruction to make the purchase. Next, step 313 comprises responsive to receiving an instruction to make the purchase, communicating with the vendor to enable completion of the purchase. Further, in a first case that the indication was to associate with the second user the first top-level characteristic, the communicating with the vendor provides to the vendor the first top-level characteristic, without providing the first sub-level characteristic, while otherwise maintaining, in connection with the purchase, anonymity of the second user relative to the vendor. Further still, in a second case that the indication was to associate with the second user the first sub-level characteristic, the communicating with the vendor provides to the vendor the first sub-level characteristic while otherwise maintaining, in connection with the purchase, anonymity of the second user relative to the vendor.

While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3B:
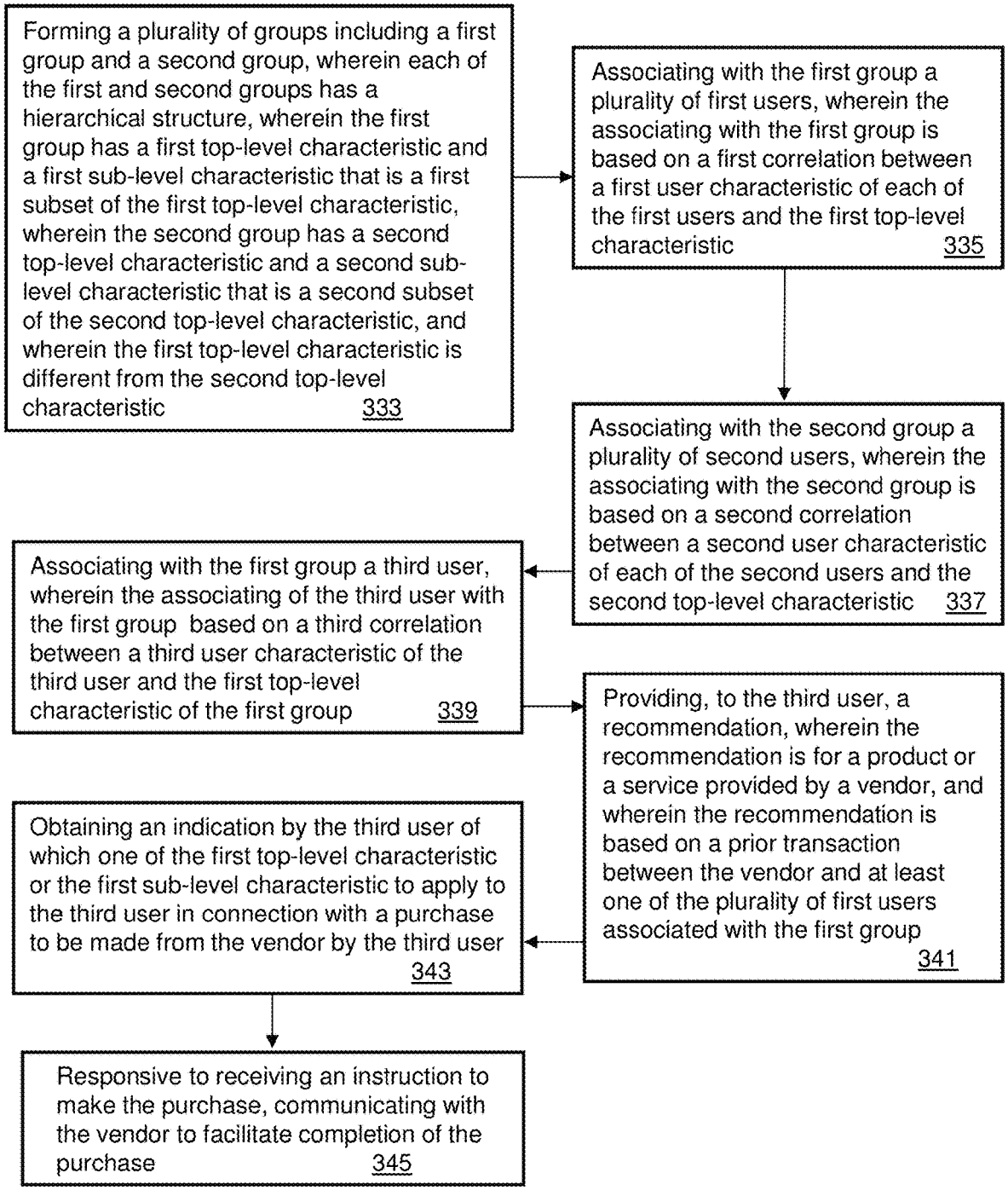
FIG. 3B depicts an embodiment of a method (which can be used, for example, in portions of the systems described in FIGS. 1, 2, 6 and 7)

Referring now to FIG. 3B, various steps of a method 330 according to an embodiment are shown. As seen in this FIG. 3B, step 333 comprises forming a plurality of groups including a first group and a second group, wherein each of the first and second groups has a hierarchical structure, wherein the first group has a first top-level characteristic and a first sub-level characteristic that is a first subset of the first top-level characteristic, wherein the second group has a second top-level characteristic and a second sub-level characteristic that is a second subset of the second top-level characteristic, and wherein the first top-level characteristic is different from the second top-level characteristic. Next, step 335 comprises associating with the first group a plurality of first users, wherein the associating with the first group is based on a first correlation between a first user characteristic of each of the first users and the first top-level characteristic. Next, step 337 comprises associating with the second group a plurality of second users, wherein the associating with the second group is based on a second correlation between a second user characteristic of each of the second users and the second top-level characteristic. Next, step 339 comprises associating with the first group a third user, wherein the associating of the third user with the first group based on a third correlation between a third user characteristic of the third user and the first top-level characteristic of the first group. Next, step 341 comprises providing, to the third user, a recommendation, wherein the recommendation is for a product or a service provided by a vendor, and wherein the recommendation is based on a prior transaction between the vendor and at least one of the plurality of first users associated with the first group. Next, step 343 comprises obtaining an indication by the third user of which one of the first top-level characteristic or the first sub-level characteristic to apply to the third user in connection with a purchase to be made from the vendor by the third user. Next, step 345 comprises responsive to receiving an instruction to make the purchase, communicating with the vendor to facilitate completion of the purchase. Further, in a first case that the indication was to apply the first top-level characteristic to the third user, the communicating with the vendor provides to the vendor the first top-level characteristic, without providing the first sub-level characteristic, while otherwise maintaining, in connection with the purchase, anonymity of the third user relative to the vendor. Further still, in a second case that the indication was to apply the first sub-level characteristic to the third user, the communicating with the vendor provides to the vendor the first sub-level characteristic while otherwise maintaining, in connection with the purchase, anonymity of the third user relative to the vendor.

While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3C:
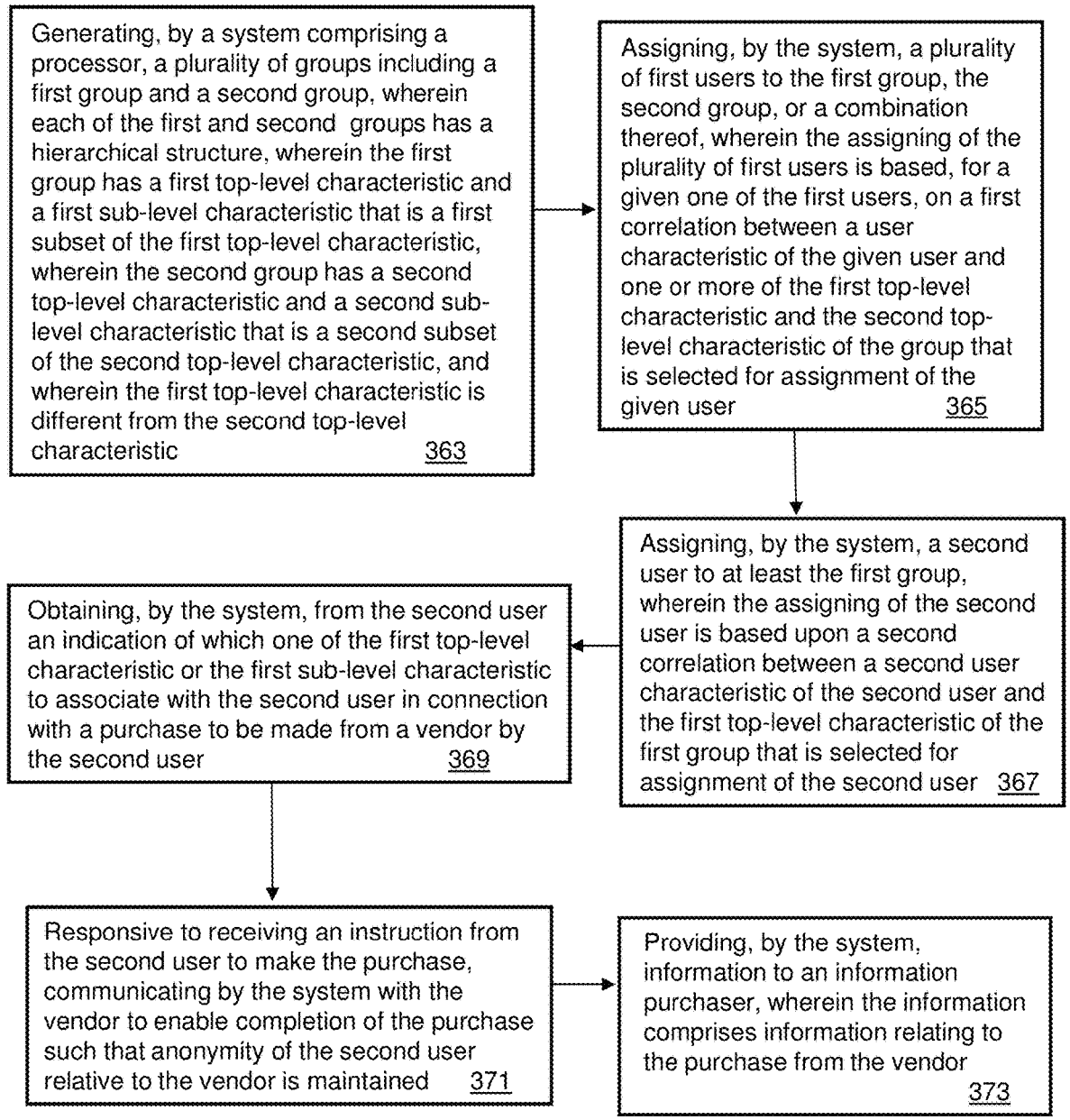
FIG. 3C depicts an embodiment of a method (which can be used, for example, in portions of the systems described in FIGS. 1, 2, 6 and 7)

Referring now to FIG. 3C, various steps of a method 360 according to an embodiment are shown. As seen in this FIG. 3C, step 363 comprises generating, by a system comprising a processor, a plurality of groups including a first group and a second group, wherein each of the first and second groups has a hierarchical structure, wherein the first group has a first top-level characteristic and a first sub-level characteristic that is a first subset of the first top-level characteristic, wherein the second group has a second top-level characteristic and a second sub-level characteristic that is a second subset of the second top-level characteristic, and wherein the first top-level characteristic is different from the second top-level characteristic. Next, step 365 comprises assigning, by the system, a plurality of first users to the first group, the second group, or a combination thereof, wherein the assigning of the plurality of first users is based, for a given one of the first users, on a first correlation between a user characteristic of the given user and one or more of the first top-level characteristic and the second top-level characteristic of the group that is selected for assignment of the given user. Next, step 367 comprises assigning, by the system, a second user to at least the first group, wherein the assigning of the second user is based on a second correlation between a second user characteristic of the second user and the first top-level characteristic of the first group that is selected for assignment of the second user. Next, step 369 comprises obtaining, by the system, from the second user an indication of which one of the first top-level characteristic or the first sub-level characteristic to associate with the second user in connection with a purchase to be made from a vendor by the second user. Next, step 371 comprises responsive to receiving an instruction from the second user to make the purchase, communicating by the system with the vendor to enable completion of the purchase such that anonymity of the second user relative to the vendor is maintained. Next, step 373 comprises providing, by the system, information to an information purchaser, wherein the information comprises information relating to the purchase from the vendor. Further, in a first case that the indication was to associate with the second user the first top-level characteristic, the information provided to the information purchaser comprises the first top-level characteristic without providing the first sub-level characteristic (while also, for example, maintaining the anonymity of the second user with respect to the information purchaser). Further still, in a second case that the indication was to associate with the second user the first sub-level characteristic, the information provided to the information purchaser comprises the first sub-level characteristic (while also, for example, maintaining the anonymity of the second user with respect to the information purchaser).

While for purposes of simplicity of explanation, the respective processes are shown and described as a series of blocks in FIG. 3C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4A:
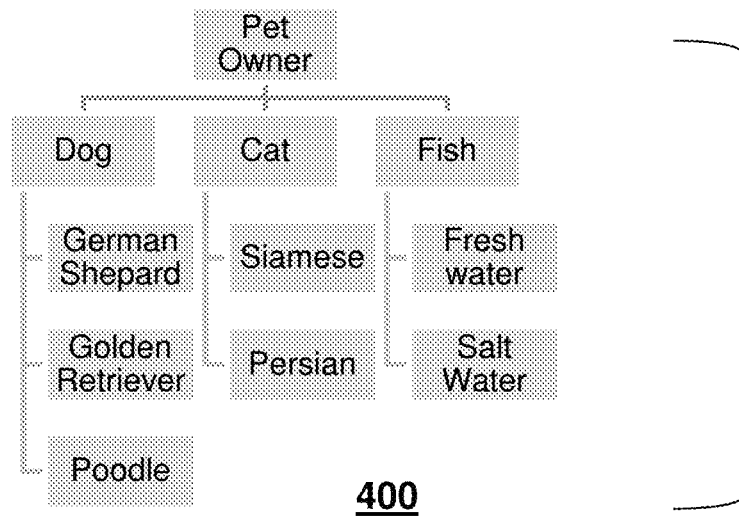
FIGS. 4A-4C depict diagrams related to example group characteristics according to an embodiment.
Figure 4B:
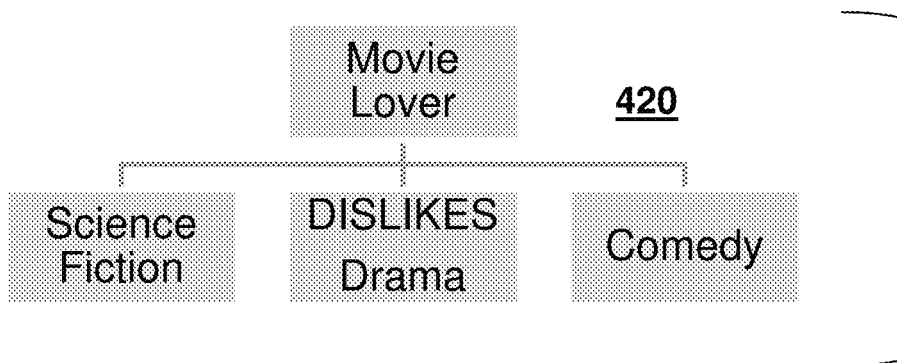
Figure 4C:
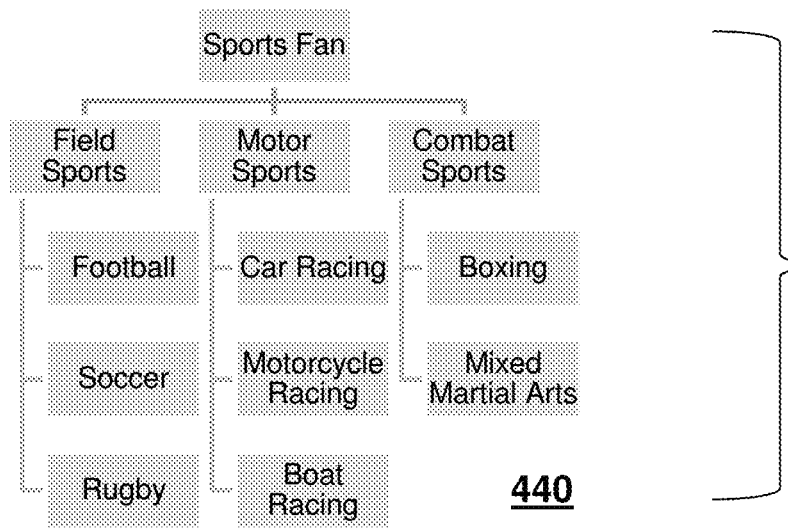

Referring now to FIGS. 4A-4C, a number of examples of groups having hierarchical structures according to various embodiments are shown. As seen in FIG. 4A, group 400 has top-level group characteristic "Pet Owner". A number of sub-level group characteristics under "Pet Owner" are "Dog," "Cat," and "Fish". Further sub-level group characteristics under "Dog" are "German Shepard," "Golden Retriever," and "Poodle". Further sub-level group characteristics under "Cat" are "Siamese," and "Persian". Further sub-level group characteristics under "Fish" are "Fresh Water," and "Salt Water". As seen in FIG. 4B, group 420 has top-level group characteristic "Movie Lover". A number of sub-level group characteristics under "Movie Lover" are "Science Fiction," "DISLIKES Drama," and "Comedy". As seen in FIG. 4C, group 440 has first top-level group characteristic "Sports fan". A number of sub-level group characteristics under "Sports Fan" are "Field Sports," "Motor Sports," and "Combat Sports". Further sub-level group characteristics under "Field Sports" are "Football," "Soccer," and "Rugby". Further sub-level group characteristics under "Motor Sports" are "Car Racing," and "Motorcycle Racing," and "Boat Racing". Further sub-level group characteristics under "Combat Sports" are "Boxing," and "Mixed Martial Arts". Of course, any desired top-level group characteristics and/or sub-level group characteristics can be used. Further, any desired number of top-level group characteristics can be used. Further, any desired number of sub-level group characteristics can be used. Further, the hierarchical structure of each group can be any desired number of sub-levels deep. Further, any group characteristic can be a "like" (shown in FIGS. 4A-4C as simply a label) or a "dislike" (such as shown in FIG. 4B as "DISLIKES Drama"). Further still, any group characteristic can have a weight applied thereto (e.g., 10 for "strongly likes", 5 for "neutral" and 1 for "strongly dislikes").

Figure 5A:
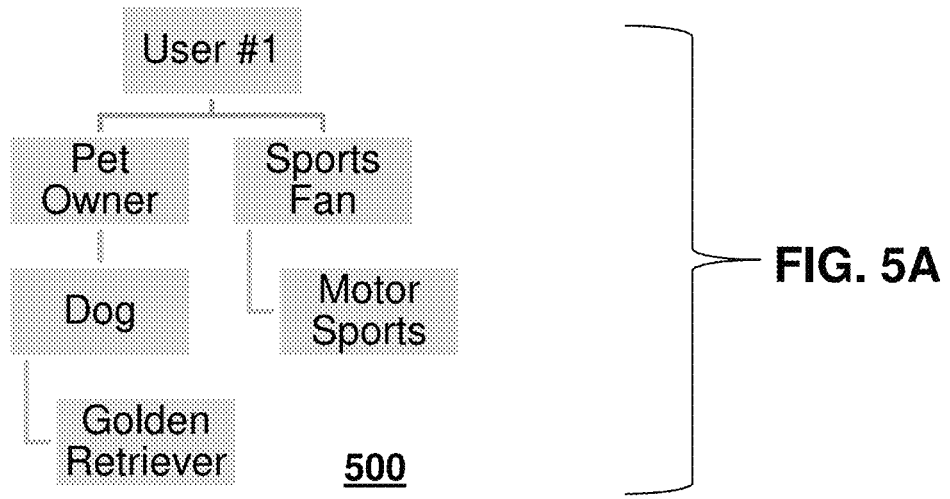
FIGS. 5A-5C depict diagrams related to example user characteristics according to an embodiment.
Figure 5B:
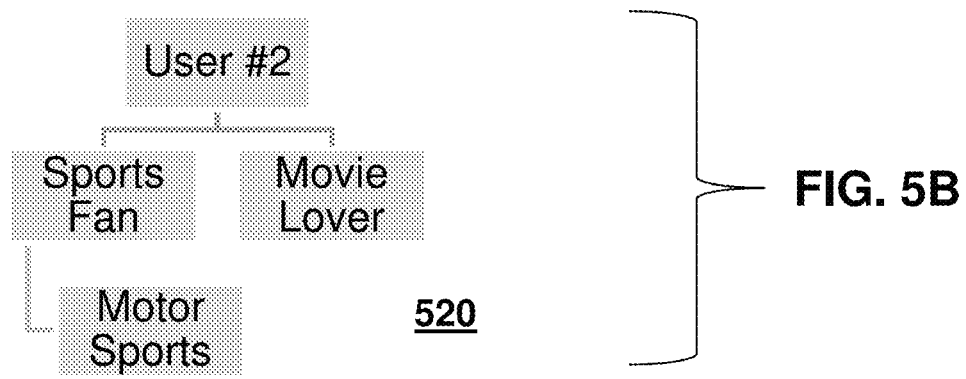
Figure 5C:
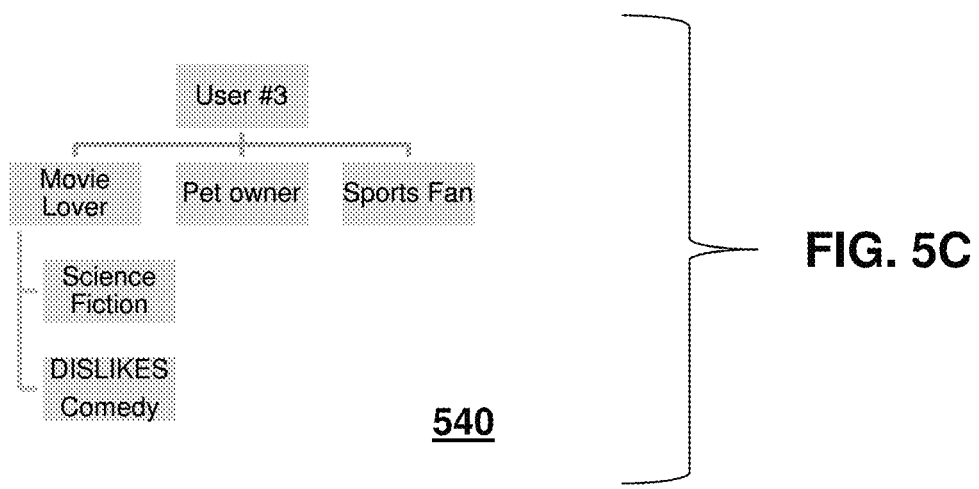

Referring now to FIGS. 5A-5C, a number of examples of hierarchical characteristics of users according to various embodiments are shown. As seen in FIG. 5A, graph 500 of characteristics of User #1 is shown. In this example, the characteristics of User #1 are that User #1 is a pet owner (who owns a dog that is a golden retriever) and that User #1 is a sports fan (who likes motor sports). As seen in FIG. 5B, graph 520 of characteristics of User #2 is shown. In this example, the characteristics of User #2 are that User #2 is a sports fan (who likes motor sports) and that user #2 is a movie lover. As seen in FIG. 5C, graph 540 of characteristics of User #3 is shown. In this example, the characteristics of User #3 are that User #3 is a movie lover (who likes science fiction and dislikes comedy), that User #3 is a pet owner, and that User #3 is a sports fan. Of course, any desired top-level user characteristics and/or sub-level user characteristics can be used. Further, any desired number of top-level user characteristics can be used. Further, any desired number of sub-level user characteristics can be used. Further, the hierarchical structure of each of the user characteristics can be any desired number of sub-levels deep. Further, any user characteristic can be a "like" (shown in FIGS. 5A-5C as simply a label) or a "dislike" (such as shown in FIG. 5C as "DISLIKES Comedy"). Further still, any user characteristic can have a weight applied thereto (e.g., 10 for "strongly likes", 5 for "neutral" and 1 for "strongly dislikes").

In various embodiments, each user can chose for himself or herself which user characteristic(s) to expose (e.g., which user characteristic(s) to expose for a given vendor; which user characteristic(s) to expose for a given transaction; which user characteristic(s) to expose for a given communication; which user characteristic(s) to expose for a given web browsing session). In various embodiments, each user can make such a choice of which user characteristic(s) to expose in real-time. In various specific examples, a given user can choose to expose for a particular vendor or a particular transaction only a higher level (more general) characteristic (e.g., pet owner) and can chose to expose for a different vendor or different transaction a lower level (more specific) characteristic (e.g., dog owner, or golden retriever owner). In various examples, payments can be made (e.g., by the vendor to the user(s) and/or provider of the anonymization service) based on the specificity of the information exposed. For example, a vendor (or other interested party) could pay a first (lower) fee for generic information related to a top-level user characteristic; the vendor (or other interested party) could pay a second (higher) fee for more specific information related to a sub-level user characteristic, and the vendor (or other interested party) could pay a third (even higher) fee for yet even more specific information related to a sub-sub-level user characteristic. In one specific example, the user can receive higher payments based on exposing more specific information.

In various embodiments, the user characteristic(s) can be used to associate a particular user with one or more groups. In various embodiments, the user characteristic(s) can be stored in user profiles (e.g. characteristic(s) for a given user can be stored in a particular user profile for that given user). In various embodiments, the user characteristics can be stored in one or more databases. In various embodiments, the user characteristic(s) of a given user can be used to provide one or more recommendations to the given user (e.g. one or more purchasing recommendations).

As described herein, various embodiments provide for securing privacy through anonymization, wherein the anonymization can be directed to emails, web activity (e.g., searching, viewing), browser history, telephone calls and/or physical mail. In one embodiment, a first person (or other entity) trying to monitor the activities of a second person (or other entity) would not be able to identify the second person (or other entity) as the sender or recipient (the anonymization could be carried out, for example, via use of different email addresses, different IP addresses, and/or different physical mailing addresses). In another embodiment, publication (e.g., online publication; publication in the form of information or data (such as marketing data)) of certain likes/dislikes that a person (e.g. a user of the services described herein) has can be controlled (e.g., certain likes/dislikes can be prohibited from being made public; certain likes/dislikes can be prohibited from being sold as marketing data; certain likes/dislikes can be allowed to be made public; certain likes/dislikes can be allowed to be sold as marketing data).

As described herein, anonymization functionality can be used to provide recommendations for shared user experiences (e.g. pooling recommendations to the groups from vendors but spreading that recommendation to all members of a group).

As described herein, mechanisms are provided to allow a personal assistant to act on behalf of a user through an anonymization service (which can have additional automation over a typical shopping or other experience).

As described herein, the anonymization service can be applied in the context of various entities (e.g., commercial, governmental) that must maintain singular user registration (e.g., for avoiding fraud).

As described herein, the anonymization service can actively search and notify a user of non-anonymous information that has been exposed. In one example, the service finds this by looking at vendors along the lines of groups that apply to the user). In various specific examples, the anonymization service can follow-up on a user's social feeds, public transactions, and/or other private demographics listing services to validate that a transaction (known to the service) did not leak any personal details through transactions with a vendor or other identifiable information that the user had not pre-authorized for usage by a vendor.

As described herein, in addition to anonymization, the service could allow a given user to select different personas that are also anonymized.

In various embodiments, one or more of the following are provided: (a) full coverage of actions (e.g., call, package, payment, online browsing) can be anonymized; (b) anonymization that can be partially obscuring of actions by pooling among a large set of individuals (e.g. all 100 dog-owners in your zip code); (c) alerting of when personal information is likely to be (or has been) leaked/exposed; (d) allowing real-time decision of anonymization (e.g., deciding of on/off use (or amount of anonymization) of service); (e) when mapping a user to a more generic profile, automatically determining membership weights and/or clustering based on wholistic set of actions (also, recommendation for similar groups); and/or (f) recapturing of user data with respect to privacy and sharing so that data and actions can be explicitly kept and/or monitored by a given user.

As described herein, various embodiments anonymize (or help to anonymize) user actions through a distributed network of executors, thereby offering an "anonymized identity". The service can mix actions (across many modalities) with those of other individuals while (optionally) still maintaining a loose correlation so that an individual user can get recommendations (wherein such recommendations can be at least partially personalized). In various examples, the service accommodates digital experiences, financial transactions, physical package delivery, and/or account management with closed-system vendors (e.g. walled-garden shopping among online retailers) by bulk accounts that are cycled among a large pool of individuals.

In various embodiments, one or more of the following are provided: (a) putting users in control of their action data by allowing them to choose the appropriate level of anonymization; (b) allowing each individual user to get recommendation(s) from a wide group of individuals matching that particular user's broader/bigger interest (e.g. just dog care recommendations) instead of recommendations that may vary based on their daily actions; (c) allowing a user to switch "personalities" and get recommendation(s) from different sub-sets of other similar users (e.g. dog care vs. model play hobbyist vs. sci-fi fan); (d) extending action privacy into physical domain (e.g., payment, package, etc); (e) allowing users to (optionally) monetize their action data through a single service regardless of individual vendor data management policies; (f) a trusted service provider (wherein users can have fewer concerns over fraud such as caused by identity leakage among colluding vendors (e.g. online retailer+grocery store=full personal description)).

As described herein, the service can provide useful protection (e.g., anonymization) for various entities (e.g., individuals, corporations, government organizations) that are sensitive to marketing overreach that can be enabled by precise action monitoring.

In various embodiments, when information is provided to a purchaser (e.g., certain sub-level information) the purchaser can also be provided with the more generic information above that particular sub-sub level information).

As described herein, various embodiments can provide for anonymization of browser history and/or consumption history (e.g., consumption of electric data).

As described herein, various embodiments can provide a feature wherein, if a user's real telephone number is publically released, the service can monitor for use of that real telephone number and then associate that real telephone number with a dummy telephone number.

As described herein, various embodiments can provide benefits related to finding more relevant products/services while also giving users anonymization control (such as to decrease the amount of tracking underway). Various embodiments improve upon some conventional uses of virtual private networks (VPNs), bots, cookie obfuscators, etc. In this regard, various embodiments can, in certain circumstances cover all (or almost all) potential user actions (e.g., phone calls, packages, payments, etc.).

As described herein, various embodiments can provide anonymization while still allowing users to gain certain benefits of relevant advertising. In one example, the anonymization can be by partial action obscurity (e.g., maintain anonymity of a user with respect to the user's address, but permit publication of the user's name).

As described herein, various embodiments can provide (e.g., through a distributed network of executors) an "anonymized identity". In various examples, the service can provide anonymization by mixing a given user's actions with actions of other users (while still maintaining a loose correlation of preferences).

In one example, in the case of use of bots and/or personal assistants to execute actions, a given user can be assigned (e.g., randomly) to a new personal assistant that does not convey that given user's true identity. In one example, if a given user uses a bot to get his or her groceries, then the service could elect to select different bots in different locations.

In one example, the service could enforce a "memory fade-out" (e.g., on the bots) so that a lifetime of shopping history is not available. In one example, the user data available (e.g., to advertising entities) could be curtailed (e.g., slowly curtailed) or otherwise controlled by the service and/or by the users.

In another example, a given user could be able to tune a setting for how much they want their anonymized identity to be correlated to their actions. In another example, the service could locally correlate the actions of users and pool them into "anonymized identities" that still share some actions (e.g., people who like to shop for sports gear could use the service, which could aggregate their viewing and purchasing actions behind an identity that is anonymized; the service could still disambiguate who did what, but advertisers looking at the pooled identity would get a mash-up of all pooled users' actions, thereby adding some level of uncertainty). In one example, the pooling of users to anonymized identities could be exaggerated such that, e.g., a sports centric shopper is evenly mixed in with shoppers for furniture, cars, etc.

In another example, the service could offer tools to anonymize/pool payments, actions, and/or contact points (e.g., address, phone, etc.).

In another example, a secondary (e.g., remote and/or external) transaction server (e.g., backed by one or more blockchains) could keep track of user payments to the anonymization service; it would then (in this example) pay the merchants instead of directly coming from the user. In another example, a merchant could access the blockchain/secondary server for a fee (e.g., without showing ID's).

In another example, decoy shipping addresses and/or decoy phone details could be used (e.g., from a bank of 1000 phone numbers, the service could assign a given user a number for a single transaction but then ignore/discard other attempts to call that given user at that number (e.g., after a certain time period).

In another example, users can be financially incentivized.

In another example, various embodiments can be applied in the context of purchasing with bots and web browsing. In another example, bots can be aggregated at a large company controller instead of at individual level.

In another example, various embodiments can be applied in the context of a service on top of a residential gateway (RG). In one specific example, the RG can be at a user's home. In one specific example, a more passive login can be provided. In one specific example, the RG can be part of a distributed processing system. In one specific example, the RG can provide all or part of the intelligence for performing various operations described herein. In another example, the RG could support an Internet browser, a cloud VoIP and/or any other appropriate functions.

In another example, various embodiments can provide for (or help with) phone call redirection.

In another example, various embodiments can provide for a central anonymizer that could detect (or help to detect) an anomaly or malicious group/activity.

In another example, various embodiments can provide for shipping via a drop office.

In another example, various embodiments can provide for implementations in a service provider's network.

In another example, various embodiments can leverage brand and/or locations of a national chain with multiple physical locations.

In another example, various embodiments can provide for monitoring the user actions and storing such user actions in a database (in one specific example, a unique id could be associated with each user and such unique id can be stored so that the user could be aggregated).

In another example, various embodiments can provide for a proxy to have highly rotated IPs and services (e.g., to allow continual hiding by rotation).

In another example, various embodiments can provide for protection (e.g., anonymization) that could be intermittent (e.g., user can turn on and off in a browser).

In another example, various embodiments can provide for tracking of user behavior (e.g., where personalization is desired by a given user).

In another example, various embodiments can allow for a given user to select from alternate personas (e.g., in a manner similar to a conventional process that is applied to spam e-mail accounts).

In another example, a user can decide to be anonymous (or semi-anonymous) and the user can control distribution of information in connection with monitoring of: Internet communications; purchasing; package delivery; and/or other communications.

In another example, location information can be used in connection with anonymizing incoming/outgoing phone calls, incoming/outgoing emails, incoming/outgoing physical mail, incoming/outgoing bills. In another example, the anonymization can be selective (e.g., applied to all communication modalities or a subset of the communication modalities). In one example, the anonymization can be applied to a phone call only to a certain entity (e.g., another user of the service) and/or the anonymization can be applied to a phone call only from a certain entity (e.g., another user of the service). In another example, an incoming caller can be anonymized.

In another example, a vendor can have its own anonymization service (in one specific example, when the vendor has its own anonymization service, this can be recognized so that the service described herein does not need to duplicate anonymization).

In other examples, anonymization can incorporate a web proxy, text, and/or call routing (e.g., outgoing/incoming).

In another example, a bulk account (which can be, for example, temporary) can provide any detectable information for a recommendation (such as related, for example, to a particular group).

In another example, an escrow can be a neighbor (e.g., to accept a package) and/or a local company (e.g., that delivers a package to the user).

In another example, available private information can be adjusted (e.g., if a user is receiving too many dog food recommendations, then the user can remove pet owner characteristic as information that is available to be published/accessed/sold/shared). In another example, each user can control respective information that can be published/accessed/sold/shared.

In another example, exposure of information (e.g., information that can be published/accessed/sold/shared) can be on an individual basis (e.g., the extent of information that can be published/accessed/sold/shared can vary for each user).

In another example, exposure of information can include, when authorized by a particular user, details of that particular user (e.g., including identifying information).

In another example, exposure of information can comprise keeping a particular user anonymous but informing an interested party about "USER 1234" who is a member of "GROUP ABCD" and allowing the interested party to provide to the particular user an advertising offer (e.g., via the anonymization service) without revealing certain details (e.g., name, address) of the particular user. In one specific example, the advertising can be presented on one or more web pages surfed by the user and/or sent to the user.

In another example, the anonymization service can act as a middleman (e.g., for loans, background checks). In another example, the anonymization service can make guarantees.

In another example, the anonymization service can provide switchable personas for a given user (e.g., work persona associated with certain characteristics vs. personal persona associated with other, different characteristics). In one example, a particular persona of a given user can be applied by the anonymization service based on time of day, day of week, location (e.g., home or work). In one example, a work persona of a given user can allow distribution of certain information (e.g., job title, employee name) and a personal person of the given user can allow distribution of other, different information (e.g., hobbies, pets). In another example, different personas of a given user can be applied to different actions (e.g., one persona associated with phone calls and another, different persona associated with purchases).

In another example, association of a given user with a given group can be monitored (e.g., to see if there is a violation of a rule or regulation).

In another example, contact information can be changed if/when certain information has been distributed without consent of a user.

In another example, anonymization with regard to given information can be provided through use of other information that hides the given information (this can be performed, for example, in a proactive manner). In another example, numbers (e.g., telephone numbers) can be changed and/or interim accounts can be used).

In another example, various embodiments can utilize and/or enable crypto-currency.

In another example, each party involved with the anonymization can be given the option to opt-in as desired. In another example, each party involved with the anonymization can be given the option to opt-out as desired. In another example, each party involved with the anonymization can be made aware of the anonymization.

In another example, use of the anonymization service can be monitored to reduce (or eliminate) uses that are not permitted.

In another example, a user can have the option to allow (or not allow) private information to be conveyed. In one specific example, the user can indicate his or her preferred option through a profile or other means.

Figure 6:
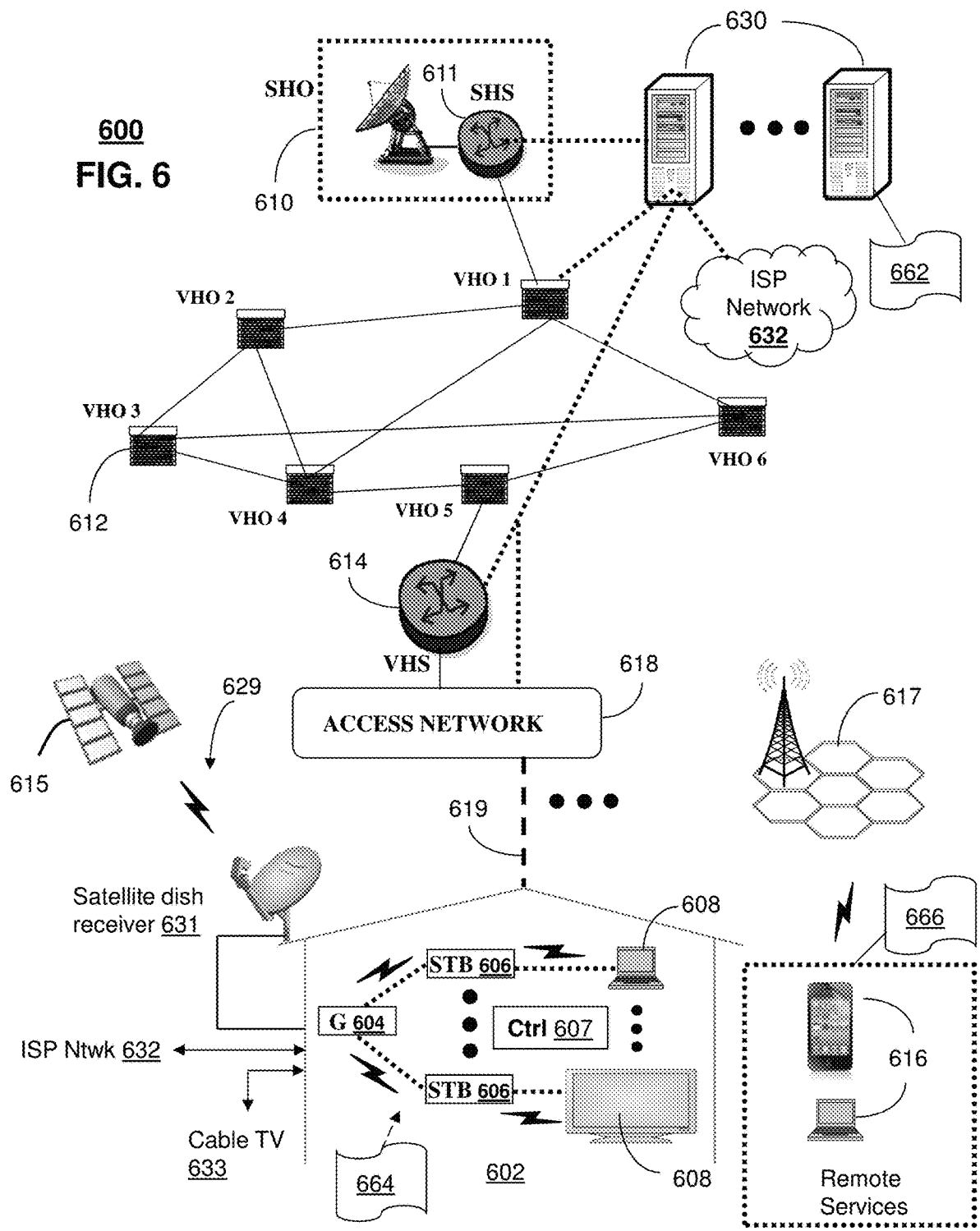
FIGS. 6-7 depict embodiments of communication systems that provide services, such as media services and/or other communications services (in various examples, some or all of the elements of FIGS. 6-7 can be used to implement communications among user 103 of FIG. 1, service 105 of FIG. 1, vendor 107 of FIG. 1 and/or escrow 109 of FIG. 1; in other examples, some or all of the elements of FIGS. 6-7 can be used to implement communications among user 203 of FIG. 2, service 205 of FIG. 2, vendors 207A, 207B of FIG. 2, data purchasers 213A, 2013B of FIG. 2 and/or marketplace 211 of FIG. 2)

FIG. 6 depicts an illustrative embodiment of a communication system 600 for providing various services, such as delivering media content and/or other communications services. The communication system 600 can represent an interactive media network, such as an interactive television system (e.g., an Internet Protocol Television (IPTV) media system). Communication system 600 can be overlaid or operably coupled with one or more elements of FIGS. 1 and 2 as another representative embodiment of communication system 600. For instance, one or more devices illustrated in the communication system 600 of FIG. 6 can operate as service 105 of FIG. 1 and/or service 205 of FIG. 2.

In one or more embodiments, the communication system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol. The VHS 614 can distribute multimedia broadcast content via an access network 618 to commercial and/or residential buildings 602 housing a gateway 604 (such as a residential or commercial gateway).

The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a privacy service server (herein referred to as privacy service server 630). The privacy service server 630 can use computing and communication technology to perform function 662, which can include among other things, anonymization services described herein. For instance, function 662 of privacy service server 630 can be similar to the functions described for service 105 of FIG. 1 and/or service 205 of FIG. 2. The media processors 606 and wireless communication devices 616 can be provisioned with software functions 664 and 666, respectively, to utilize the services of privacy service server 630. For instance, functions 664 and 666 of media processors 606 and wireless communication devices 616 can be similar to the functions described for user devices (see, e.g., user 103 of FIG. 1 and user 203 of FIG. 2).

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
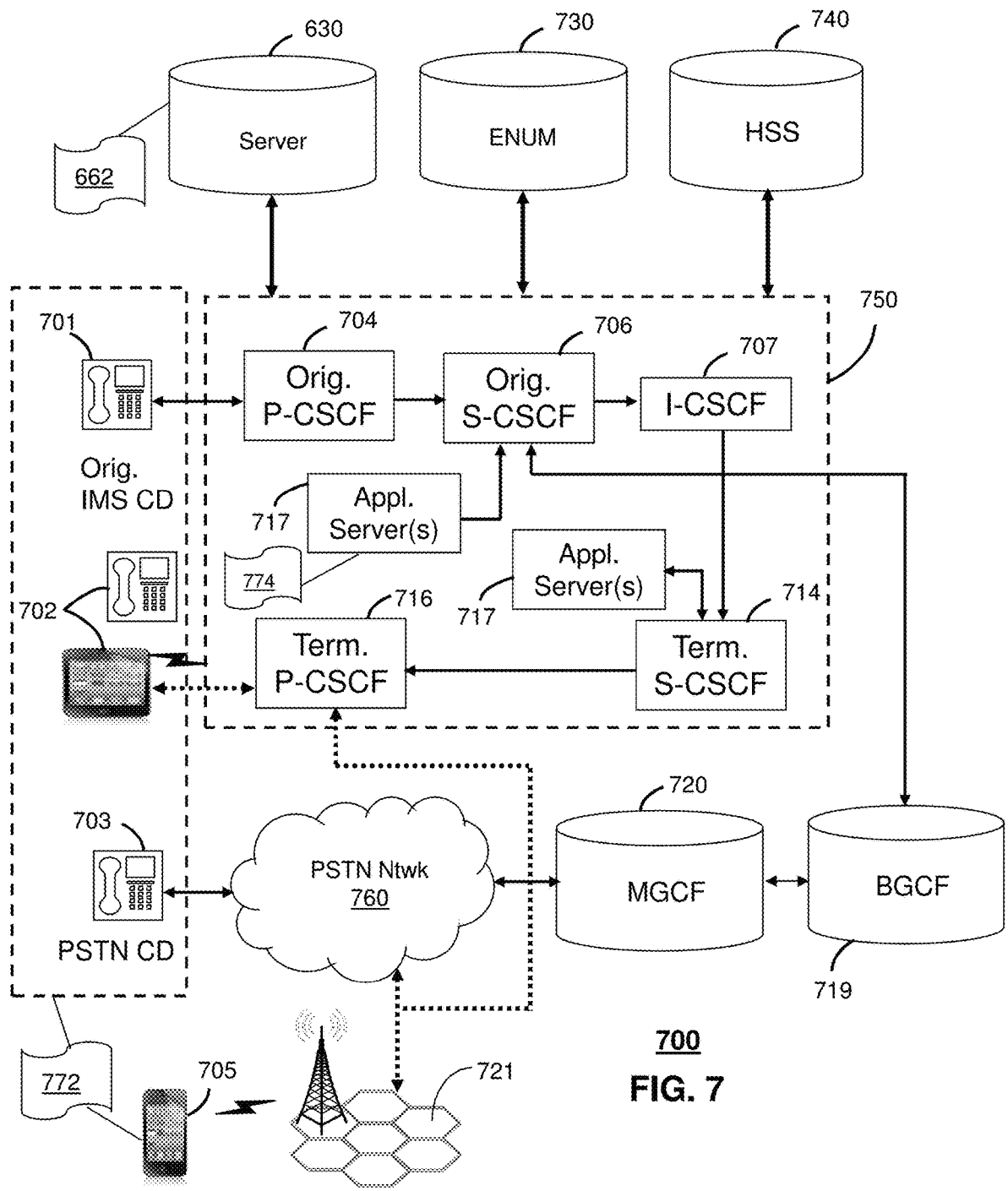

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled one or more elements of FIG. 1 and/or FIG. 2 and/or communication system 600 as another representative embodiment of communication system 700.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The privacy service server 630 of FIG. 6 can be operably coupled to communication system 700 for purposes similar to those described above. Privacy service server 630 can perform function 662 and thereby provide anonymization services to the CDs 701, 702, 703 and 705 of FIG. 7 (e.g., similar to certain functions described accordance with the methods of FIGS. 3A-3C). CDs 701, 702, 703 and 705 can be adapted with software to perform function 772 to utilize the services of the privacy service server 630 (e.g., similar to certain functions described in accordance with the methods of FIGS. 3A-3C). Privacy service server 630 can be an integral part of the application server(s) 717 performing function 774, which can be substantially similar to function 662 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
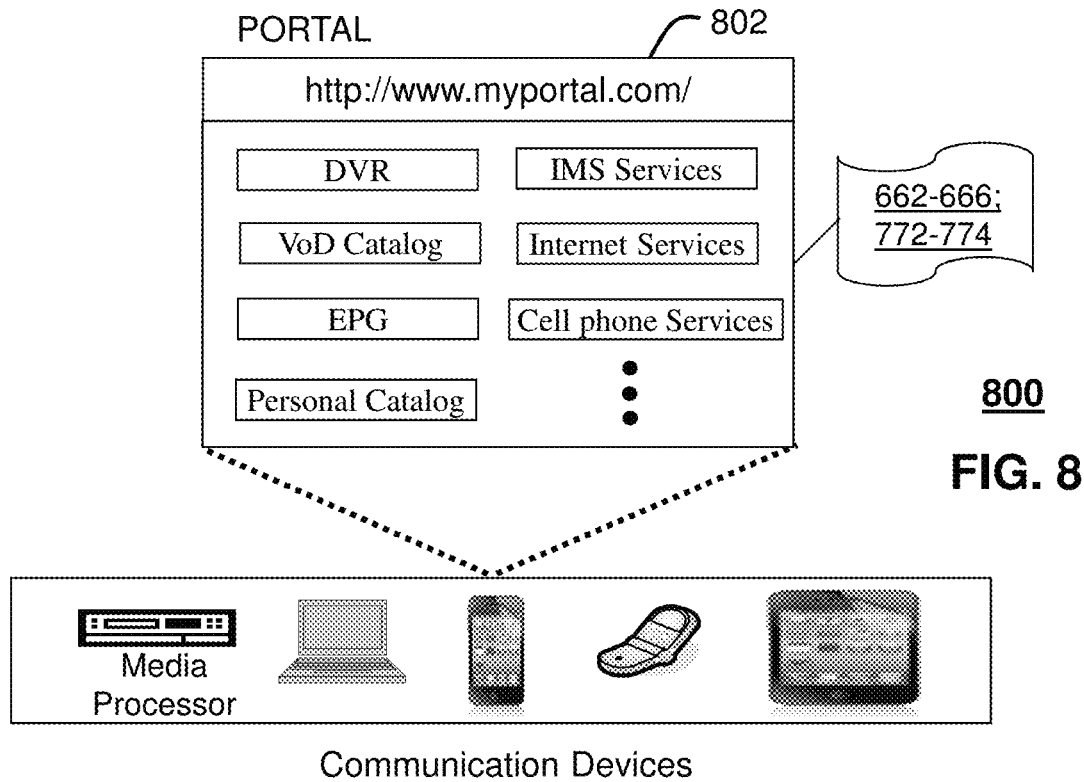
FIG. 8 depicts an embodiment of a web portal for interacting with various communication systems (in various examples, some or all of the elements of FIG. 8 can be used by and/or interact with user 103 of FIG. 1, service 105 of FIG. 1, vendor 107 of FIG. 1 and/or escrow 109 of FIG. 1; in other examples, some or all of the elements of FIG. 8 can be used by and/or interact with user 203 of FIG. 2, service 205 of FIG. 2, vendors 207A, 207B of FIG. 2, data purchasers 213A, 2013B of FIG. 2 and/or marketplace 211 of FIG. 2; in addition, some or all of the elements of FIG. 8 can be used by and/or interact with elements of FIGS. 6-7)

FIG. 8 depicts an illustrative embodiment of a web portal 802 of a communication system 800. Communication system 800 can be overlaid or operably coupled with one or more elements of FIGS. 1 and 2, communication system 600, and/or communication system 700 as another representative embodiment of the systems of FIGS. 1 and 2, communication system 600, and/or communication system 700. The web portal 802 can be used for managing services of systems of FIGS. 1 and 2, and/or communication systems 600-700. A web page of the web portal 802 can be accessed by a Uniform Resource Locator (URL) with an Internet browser using an Internet-capable communication device such as those described in FIGS. 1, 2 and/or FIGS. 6-7. The web portal 802 can be configured, for example, to access a media processor and/or other communication devices and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor and/or other communication devices. The web portal 802 can also be used for provisioning IMS services described earlier, provisioning Internet services, provisioning cellular phone services, and so on.

The web portal 802 can further be utilized to manage and provision software applications 662-666, and 772-774 to adapt these applications as may be desired by subscribers and/or service providers of systems of FIGS. 1 and 2, and/or communication systems 600-700. For instance, users of the services provided by service 105 of FIG. 1, service 205 of FIG. 2, or privacy service server 630 can log into their on-line accounts and provision the service 105, service 205 and/or privacy service server 630 with user profiles, provide contact information to server to enable it to communication with devices described in connection with FIGS. 1, 2, 6 and 7, and so on. Service providers can log onto an administrator account to provision, monitor and/or maintain the systems of FIGS. 1, 2 and/or privacy service server 630.

Figure 9:
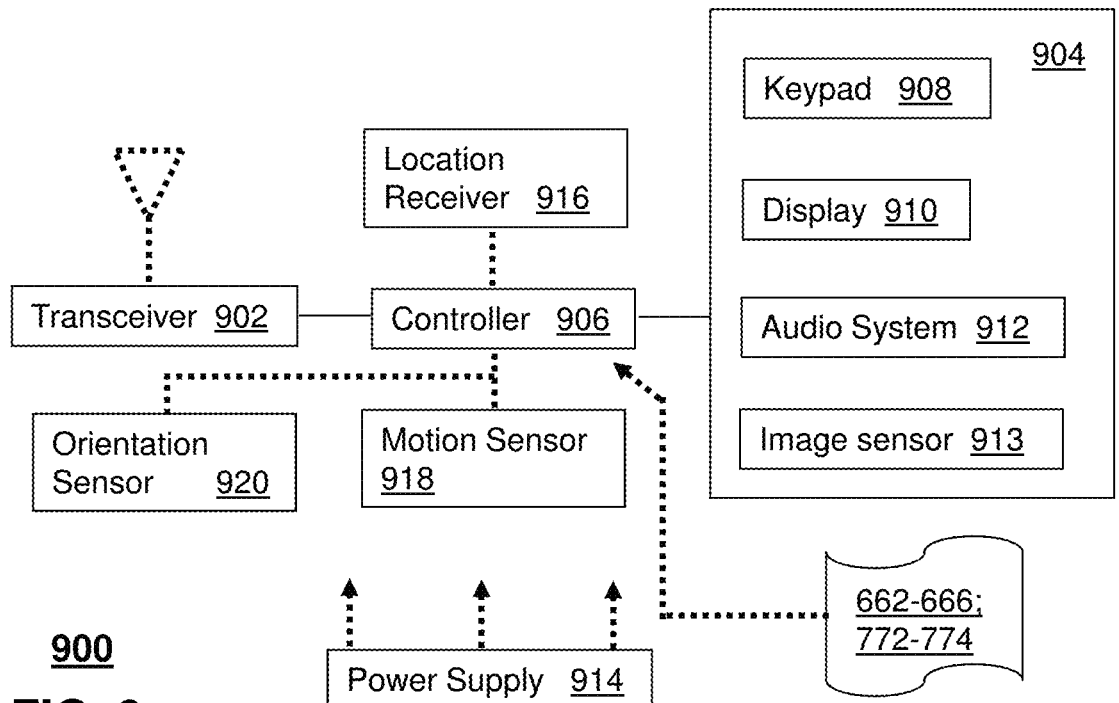
FIG. 9 depicts an embodiment of a communication device.

FIG. 9 depicts an illustrative embodiment of a communication device 900. Communication device 900 can serve in whole or in part as an illustrative embodiment of the devices depicted in and/or described in connection with FIGS. 1, 2 and/or FIGS. 6-7 and can be configured to perform portions of (or all of) the methods of FIGS. 3A-3C.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of one or more of devices shown in and/or described in connection with FIGS. 1, 2, the media processor 606, the media devices 608, and/or the portable communication devices 616 of FIG. 6, as well as the IMS CDs 701-702 and PSTN CDs 703-705 of FIG. 7. It will be appreciated that the communication device 900 can also represent other devices that can operate in systems of FIGS. 1, 2 and/or communication systems 600-700 of FIGS. 6-7 such as a gaming console and a media player. In addition, the controller 906 can be adapted in various embodiments to perform the functions 662-666 and 772-776, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
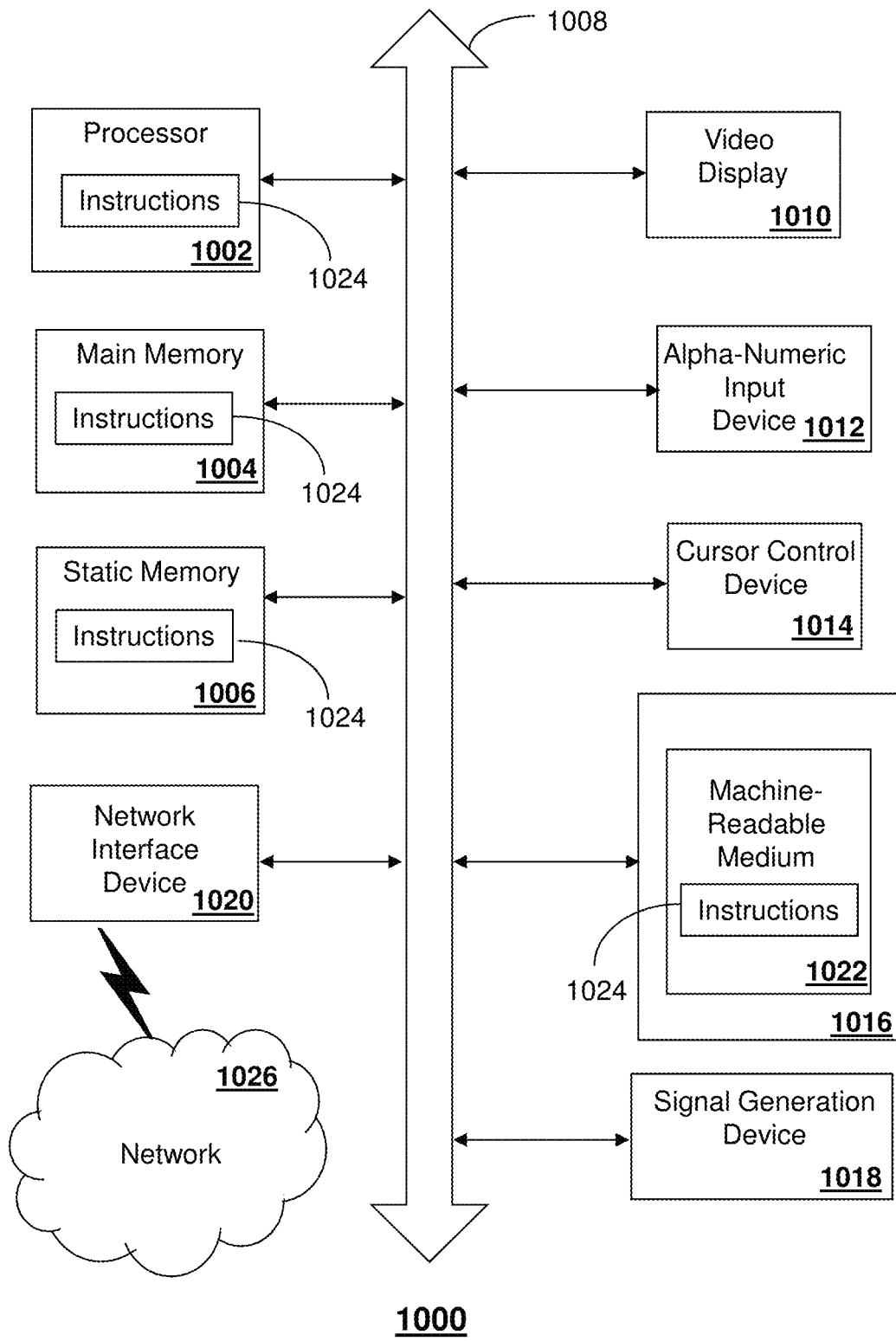
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the privacy service server 630 and/or as various devices shown in and/or described in connection with FIGS. 1 and/or 2. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to:

solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processing system including a processor; and
   a memory that stores executable instructions that, when executed by the processing system, perform operations, the operations comprising:
      generating a plurality of groups including a first group and a second group, wherein each of the plurality of groups has a hierarchical structure, wherein the first group has a first top-level characteristic and a first sub-level characteristic that is a first subset of the first top-level characteristic, wherein the second group has a second top-level characteristic and a second sub-level characteristic that is a second subset of the second top-level characteristic, and wherein the first top-level characteristic is different from the second top-level characteristic;

assigning a plurality of first users to the first group, the second group, or a combination thereof, wherein the assigning of the plurality of first users is based on a first correlation between a first user characteristic of the first users and one or more of the first top-level characteristic and the second top-level characteristic;

assigning a second user to at least the first group, wherein the assigning of the second user is based on a second correlation between a second user characteristic of the second user and the first top-level characteristic of the first group;

generating a recommendation of a product or a service provided by a vendor, wherein the recommendation is based on a prior transaction between the vendor and at least one of the plurality of first users assigned to the first group;

obtaining, from the second user, an indication of which one of the first top-level characteristic or the first sub-level characteristic to associate with the second user in connection with a purchase to be made from the vendor by the second user; and responsive to receiving an instruction to make the purchase, communicating with the vendor to enable completion of the purchase;

wherein, in a first case that the indication was to associate with the second user the first top-level characteristic, the communicating with the vendor provides to the vendor the first top-level characteristic, without providing the first sub-level characteristic, while otherwise maintaining, in connection with the purchase, anonymity of the second user relative to the vendor; and wherein, in a second case that the indication was to associate with the second user the first sub-level characteristic, the communicating with the vendor provides to the vendor the first sub-level characteristic while otherwise maintaining, in connection with the purchase, anonymity of the second user relative to the vendor.

2. The device of claim 1, wherein the operations further comprise determining for the second user the second user characteristic based on one or more prior purchases made by the second user, wherein the one or more prior purchases comprise one or more product purchases, one or more service purchases, or a combination thereof.

3. The device of claim 1, wherein the operations further comprise determining for the second user the second user characteristic based on web usage of the second user.

4. The device of claim 1, wherein the operations further comprise determining for the second user the second user characteristic based on information provided by the second user.

5. The device of claim 1, wherein the recommendation is responsive to electronic communications made by the second user.

6. The device of claim 5, wherein the electronic communications comprise Internet communications.

7. The device of claim 6, wherein the Internet communications comprises web browsing.

8. The device of claim 1, wherein the prior transaction comprises a prior product purchase and the recommendation results in recommending the product of the prior product purchase.

9. The device of claim 1, wherein the prior transaction comprises a prior service purchase and the recommendation results in recommending the service of the prior service purchase.

10. The device of claim 1, wherein the obtaining from the second user the indication is responsive to the second user receiving the recommendation.

11. The device of claim 1, wherein the obtaining from the second user the indication comprises receiving the indication from the second user in association with the instruction to make the purchase.

12. The device of claim 1, wherein the obtaining from the second user the indication comprises obtaining the indication from a user profile associated with the second user, wherein the user profile had been populated with the indication as a default indication to use in an absence of a contrary indication.

13. The device of claim 1, wherein the receiving the instruction to make the purchase is responsive to web browsing by the second user of a website of the vendor.

14. The device of claim 13, wherein the web browsing by the second user of the website of the vendor comprises anonymous web browsing.

15. The device of claim 1, wherein the communicating with the vendor to enable the completion of the purchase comprises communicating with the vendor via Internet communications.

16. The device of claim 1, wherein the vendor pays a fee to receive, in the first case, the second top-level characteristic and to receive, in the second case, the second sub-level characteristic, and wherein the fee is higher for receiving the second sub-level characteristic compared to receiving the first top-level characteristic.

17. A non-transitory machine-readable storage medium comprising executable instructions that, when executed by a system including a processor, perform operations, the operations comprising:

forming a plurality of groups including a first group and a second group, wherein each of the first group and the second group has a hierarchical structure, wherein the first group has a first top-level characteristic and a first sub-level characteristic that is a first subset of the first top-level characteristic, wherein the second group has a second top-level characteristic and a second sub-level characteristic that is a second subset of the second top-level characteristic, and wherein the first top-level characteristic is different from the second top-level characteristic;

associating with the first group a plurality of first users, wherein the associating with the first group is based on a first correlation between a first user characteristic of each of the first users and the first top-level characteristic;

associating with the second group a plurality of second users, wherein the associating with the second group is based on a second correlation between a second user characteristic of each of the second users and the second top-level characteristic;

associating with the first group a third user, wherein the associating of the third user with the first group is based on a third correlation between a third user characteristic of the third user and the first top-level characteristic of the first group;

providing, to the third user, a recommendation, wherein the recommendation is for a product or a service provided by a vendor, and wherein the recommendation is based on a prior transaction between the vendor and at least one of the plurality of first users associated with the first group;

obtaining an indication by the third user of which one of the first top-level characteristic or the first sub-level characteristic to apply to the third user in connection with a purchase to be made from the vendor by the third user; and responsive to receiving an instruction to make the purchase, communicating with the vendor to facilitate completion of the purchase;

wherein, in a first case that the indication was to apply the first top-level characteristic to the third user, the communicating with the vendor provides to the vendor the first top-level characteristic, without providing the first sub-level characteristic, while otherwise maintaining, in connection with the purchase, anonymity of the third user relative to the vendor; and wherein, in a second case that the indication was to apply the first sub-level characteristic to the third user, the communicating with the vendor provides to the vendor the first sub-level characteristic while otherwise maintaining, in connection with the purchase, anonymity of the third user relative to the vendor.

18. The non-transitory machine-readable storage medium of claim 17, wherein:

the first group has the first top-level characteristic, the first sub-level characteristic, and a first additional sub-level characteristic that is a first additional subset of the first sub-level characteristic; and the second group has the second top-level characteristic, the second sub-level characteristic, and a second additional sub-level characteristic that is a second additional subset of the second sub-level characteristic.

19. A method comprising:

generating, by a system comprising a processor, a plurality of groups including a first group and a second group, wherein each of the first group and the second group has a hierarchical structure, wherein the first group has a first top-level characteristic and a first sub-level characteristic that is a first subset of the first top-level characteristic, wherein the second group has a second top-level characteristic and a second sub-level characteristic that is a second subset of the second top-level characteristic, and wherein the first top-level characteristic is different from the second top-level characteristic;

assigning, by the system, a plurality of first users to the first group, the second group, or a combination thereof, wherein the assigning of the plurality of first users is based, for a given one of the first users, on a first correlation between a user characteristic of the given user and one or more of the first top-level characteristic and the second top-level characteristic of the group that is selected for assignment of the given user;

assigning, by the system, a second user to at least the first group, wherein the assigning of the second user is based on a second correlation between a second user characteristic of the second user and the first top-level characteristic of the first group that is selected for assignment of the second user;

obtaining, by the system, from the second user an indication of which one of the first top- level characteristic or the first sub-level characteristic to associate with the second user in connection with a purchase to be made from a vendor by the second user;

responsive to receiving an instruction from the second user to make the purchase, communicating by the system with the vendor to enable completion of the purchase such that anonymity of the second user relative to the vendor is maintained; and providing, by the system, information to an information purchaser, wherein the information comprises information relating to the purchase from the vendor;

wherein, in a first case that the indication was to associate with the second user the first top-level characteristic, the information provided to the information purchaser comprises the first top-level characteristic without providing the first sub-level characteristic; and wherein, in a second case that the indication was to associate with the second user the first sub-level characteristic, the information provided to the information purchaser comprises the first sub-level characteristic.

20. The method of claim 19, wherein the information purchaser pays a higher amount for the information in the second case as compared to the first case.

* * * * *